G. A. DAVIS.
CONNECTING DEVICE.
APPLICATION FILED FEB. 11, 1916.

1,211,296.

Patented Jan. 2, 1917.

Witnesses
J. T. L. Wright
J. Irving King

Inventor
George A. Davis

By Victor J. Evans
Attorney

UNITED STATES PATENT OFFICE.

GEORGE A. DAVIS, OF MUNCIE, INDIANA.

CONNECTING DEVICE.

1,211,296.   Specification of Letters Patent.   Patented Jan. 2, 1917.

Application filed February 11, 1916. Serial No. 77,757.

*To all whom it may concern:*

Be it known that I, GEORGE A. DAVIS, a citizen of the United States, residing at Muncie, in the county of Delaware and State of Indiana, have invented new and useful Improvements in Connecting Devices, of which the following is a specification.

This invention relates to improvements in a novel form of connecting device primarily adapted for connecting keys thereon, further for connecting the cuffs or sleeves of a garment, and still further being employed, if so desired, as a tie for lumber, laundry, baggage, and hotel checks.

The primary object of the invention is the provision of a device of the above stated character wherein the connecting element may be readily attached or removed from the attaching disk, and further if the attaching disks are so constructed to permit the displacement of the connecting member when the connecting device is in use.

With the above and other objects in view, the invention consists in the novel features, details of construction and combination of parts which will hereinafter be more fully set forth, illustrated in the accompanying drawing and pointed out in the appended claim.

Figure 1:
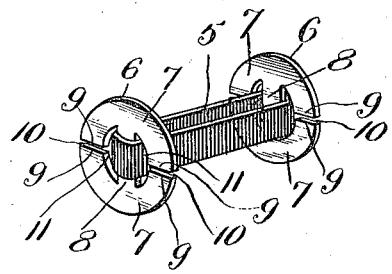
Figure 2:
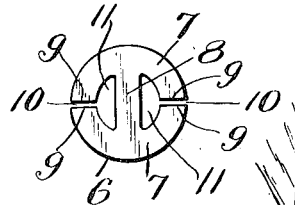
Figure 5:
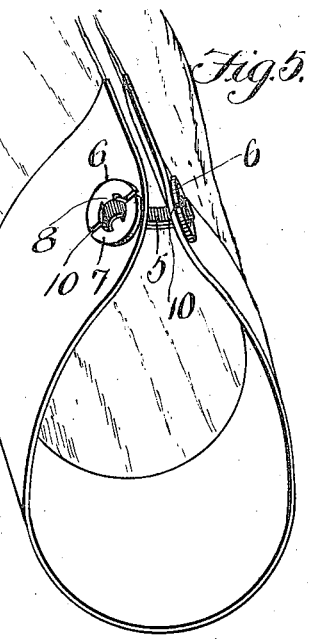
Figure 3:
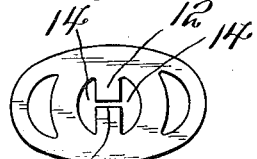
Figure 4:
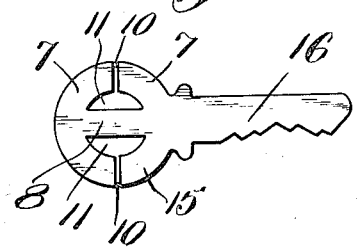

In the drawing: Figure 1 illustrates a perspective view of my improved connecting device; and Fig. 2 is a top plan view of one of the connecting disks removed therefrom. Fig. 3 is a top plan view of a further modified form of my device; Fig. 4 is a further modification showing the same as constituting a portion of a key; and Fig. 5 is a perspective view illustrating the application of my connecting device as a cuff holder.

Referring more specifically to the drawing, wherein like reference characters refer to corresponding parts in the several views, 5 denotes a connecting link which in this instance is illustrated as constructed of elastic material, but the same may be constructed of non-elastic material if found desirable. To this end 6 denotes a pair of metallic attaching disks embodying a pair of semi-cylindrical head portions 7 having formed integral with their underneath central portion a connecting bar 8, the connecting bar being disposed at right angles with respect to the head portions and defining the opposed ends 9 of the head portions in spaced relation one to the other providing a pair of diametrically opposite entrance slots 10. It will therefore be understood that in assembling the connecting device for use, the connecting link 5 is inserted in the diametric entrance slots 10 edgewise and reposed around the connecting bar 8 of the connecting disk, whereby the elastic link is permanently connected with the attaching disk and prevented from any accidental displacement thereof, owing to the positioning thereof within the semi-oval openings 11 communicating with the entrance slots 10 and formed at right angles thereto.

This connecting device has been found to be useful as a connecting device for keys whereby the keys will be suspended from the elastic connecting link and retained in a flat position with respect to the connecting link at all times and prevent the entanglement of the keys thereon, while when the connecting element is used as a cuff link or sleeve holder, will permit of the raising of the cuffs or sleeves upon the arm and prevent the soiling of the linen and further when the garment is either being removed or applied to the wearer does not necessitate the opening of the cuff or sleeve, for the reason that the elastic connecting link may be readily stretched to the extent desired for the purpose of insertion or removal of the ends from the cuffs or sleeves of such garment. In using this device further as a bundle tie for laundry, lumber, packages, baggage or hotel checks, the connecting link may be first placed around the package or bundle to be tied and the disks may be readily attached to the crossed portions of the tying element and prevent the same from working loose and supporting such in a rigid and practical manner.

From the foregoing description, taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such advantages may be made when desired as are within the scope of the claim appended thereto.

It might be further stated that this connecting device, as disclosed in the modified form in Fig. 3 of the drawing, may be provided with a connecting bar 12 provided with a transverse slot 13, said slot 13 communicating at its opposite extremity with a pair of oppositely disposed entrance slots 14, said slots 14 adapted to receive the flexible connecting element similar to that as described for the preferred form of my invention. This connecting device may be made with a solid ring outside and the slot for admission and removal of the connecting element through the single slot 13 in the middle of the bar, instead of two slots in the outside diameter of the disk or ring.

In Fig. 4 of the drawing I show a further modified form of my invention where the construction of the same is identical to that as disclosed in Figs. 1 and 2 of the drawing, with the exception that it is shown as constituting a head 15 of a key 16.

I claim:

As a new article of manufacture, a connecting device embodying a pair of disks provided with a pair of opposed semi-circular heads, a bar connecting the heads together and in spaced relation one to the other, defining a pair of entrance slots, and a flexible element connecting the said disks by the insertion of the same through said entrance slots and around the connecting bar.

In testimony whereof I affix my signature in presence of two witnesses.

GEORGE A. DAVIS.

Witnesses:
 HUBERT W. ROBERTS,
 FRED B. JACKSON.